United States Patent [19]

Kofuji

[11] Patent Number: 4,835,678
[45] Date of Patent: May 30, 1989

[54] CACHE MEMORY CIRCUIT FOR PROCESSING A READ REQUEST DURING TRANSFER OF A DATA BLOCK

[75] Inventor: Masatoshi Kofuji, Tokyo, Japan
[73] Assignee: NEC Corporation, Tokyo, Japan
[21] Appl. No.: 824,837
[22] Filed: Feb. 3, 1986

[30] Foreign Application Priority Data

Feb. 1, 1985 [JP] Japan ................... 60-16401
Apr. 1, 1985 [JP] Japan ................... 60-66619

[51] Int. Cl.⁴ .................. G06F 12/08; G06F 13/14
[52] U.S. Cl. ........................................ 364/200
[58] Field of Search ... 364/200 MS File, 900 MS File

[56] References Cited

U.S. PATENT DOCUMENTS

| | | | |
|---|---|---|---|
| 3,896,419 | 7/1975 | Lange et al. ........... | 364/200 |
| 4,169,284 | 9/1979 | Hogan et al. .......... | 364/200 |
| 4,381,541 | 4/1983 | Baumann, Jr. ......... | 364/200 |
| 4,439,829 | 3/1984 | Tsiang ................... | 364/200 |
| 4,467,419 | 8/1984 | Wakai .................... | 364/200 |
| 4,511,960 | 4/1985 | Boudreau ............... | 364/200 |

Primary Examiner—Archie E. Williams, Jr.
Assistant Examiner—Emily Y. Chan
Attorney, Agent, or Firm—Foley & Lardner, Schwartz, Jeffery, Schwaab, Mack, Blumenthal & Evans

[57] ABSTRACT

A cache memory circuit is responsive to a read request to fetch a data block in a block transfer from a main memory to a cache memory. A sequence of data units into which the data block is divided is successively assigned to a plurality of cache write registers. The assigned data units are simultaneously moved to one of sub-blocks of the cache memory during each of write-in durations with an idle interval left between two adjacent ones of the write-in durations. Each state of the sub-blocks is monitored in a controller. During the idle interval, a following read request can be processed with reference to the states of the sub-blocks even when it requests the data block being transferred. In addition, a read address for the following read request may be preserved in a saving address register to process another read request.

2 Claims, 8 Drawing Sheets

|  | | UNIT ADDRESS | BYTE ADDRESS |
|---|---|---|---|
| READ REQUEST A | BLOCK ADDRESS | 0 0 0 | X X X |
| READ REQUEST B | BLOCK ADDRESS | 0 0 1 | X X X |
| READ REQUEST C | BLOCK ADDRESS | 0 1 0 | X X X |
| READ REQUEST D | BLOCK ADDRESS | 1 0 0 | X X X |

|  | 1st CWR | 2nd CWR |
|---|---|---|
| #0 | 0 | 1 △ |
| #1 | 2 | 3 △ |
| #2 | 4 | 5 △ |
| #3 | 6 | 7 △ |

FIG.6A

|  | 1st CWR | 2nd CWR |
|---|---|---|
| #0 | — | 0 |
| #1 | 1 | 2 △ |
| #2 | 3 | 4 △ |
| #3 | 5 | 6 △ |
| #4 | 7 △ | — |

CACHE MEMORY CIRCUIT FOR PROCESSING A READ REQUEST DURING TRANSFER OF A DATA BLOCK

BACKGROUND OF THE INVENTION

This invention relates to a cache memory circuit which is for use between a main memory and a request source, such as a central processing unit.

A cache memory circuit of the type described is provided with a cache memory and is operable to fetch a data block from the main memory to the cache memory in response to a current one of read requests given from the request source when the cache memory fails to store the data block in question. The data block is divisible into a plurality of data units which are numbered from a leading data unit to a trailing one and which are successively transferred from the main memory to the cache memory. Such successive transfer of a data block will be called block transfer hereinunder.

On carrying out the block transfer, a conventional cache memory monitors reception of data units and becomes accessible at a time instant at which a trailing data unit is stored in the cache memory. Under the circumstances, a following one of the read requests should wait for completion of the block transfer of a data block for the current request when the following read request accesses the data block in question. Therefore, the following read request can not be processed in the cache memory circuit before completion of storage of the trailing data unit in the cache memory, despite of the fact that each data unit preceding the trailing data unit becomes accessible before storage of the trailing data unit.

As a result, when a read request needs block transfer, an access time for the read request must be determined by a time for the block transfer in addition to an access time of the main memory. Therefore, the access time for such a read request becomes undesiredly long.

In U.S. Pat. No. 4,467,419 issued to K. Wakai, a data processing unit is proposed to improve processing performance on block transfer from a main memory to a cache memory. To this end, the block transfer is carried out by the use of a data unit having an increased data width which may be twice a usual data width or more. With this structure, a following one of the read requests may be received by the cache memory during block transfer. However, the following read request can not access a data block which is in the course of the block transfer. In this event, the following read request must therefore be retarded until completion of the block transfer.

SUMMARY OF THE INVENTION

It is an object of this invention to provide a cache memory circuit which is capable of shortening an access time when transmission of a data block is necessary for a current one of read requests.

It is another object of this invention to provide a cache memory of the type described, wherein a following one of the read requests can rapidly be processed during block transfer of a data block.

It is still another object of this invention to provide a cache memory of the type described, wherein the following read request can access the data block which is in the course of the block transfer.

A cache memory circuit to which this invention is applicable is operable in cooperation with a main memory to fetch a data block from the main memory in response to a read request. The data block is divisible into a sequence of data units which are successively transferred from the main memory at every unit interval of time. The cache memory circuit comprises a cache memory for memorizing the data block. According to this invention, the cache memory circuit comprises write-in means coupled to the cache memory for successively writing the data units in the cache memory one by one as a sequence of stored data signals with an idle interval of time left between two adjacent ones of write-in operations, indicating means operatively coupled to the write-in means for indicating accessibility of each stored data signal, and processing means coupled to the indicating means for processing a next read request which follows the read request.

DESCRIPTION OF THE PREFERRED EMBODIMENTS

Figure 1:
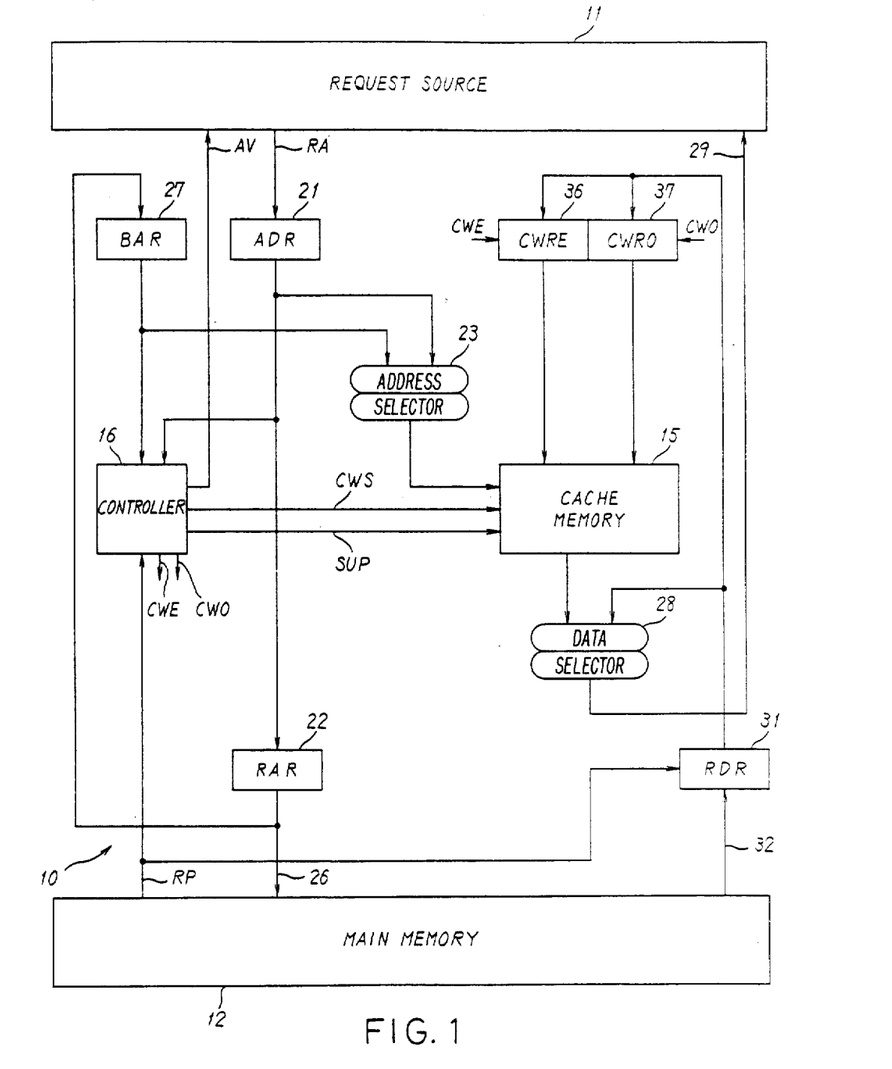
FIG. 1 shows a block diagram of a cache memory circuit according to a first embodiment of this invention together with a request source and a main memory.

Referring to FIG. 1, a cache memory circuit 10 according to a first embodiment of this invention is intermediate between a request source or a requester 11 of a central processing unit and a main memory 12. The cache memory circuit 10 comprises a cache memory 15 and a controller 16 for controlling the cache memory 15 in a manner to be described later. As known in the art, the cache memory 15 comprises an address array and a data array. In addition, an address register (ADR) 21 is connected through a read address path to store a read address signal RA of a predetermined number of bits for specifying a read address which is divisible into a block address, a unit address, and a byte address, as will later be described. The read address signal RA is accompanied by each read requests. The address register 21 is coupled to the controller 16 and a read address register (RAR) 22 and to the cache memory 15 through an address selector 23. The read address register 22 is connected to the main memory 12 through a memory address path 26 and to a block load address register (BAR) 27.

When the read address signal RA is delivered through the address register 21 and the address selector 23 to the cache memory 15, a read data signal is read out of the cache memory 15 to be sent through a data selector 28 and a read data path 29 to the request source 11, provided that the read data signal in question is stored in the cache memory 15.

If the read data signal in question is not stored in the cache memory 15, the read address signal RA is sent through the address register 21, the read address register 22, and the memory address path 26 to the main memory 12. Accessed by the read address signal RA, the main memory 12 carries out block transfer of a data block which consists of a plurality of data units. Each data unit is successively sent to a read data register (RDR) 31 one by one through a memory data path 32 in synchronism with a sequence of reply signals RP. The reply signals RP define transmission timings of the data units, respectively.

In order to carry out the above-mentioned block transfer, a block address and a unit address of the read address under consideration are sent from the read address register 22 to the main memory 12 to specify one of the data units that is indicated by the above-mentioned block address and unit address. The one data unit is therefore delivered as a leading data unit to the read data register 31 and is followed by the other data units included in the data block on the block transfer. Thus, the block transfer lasts until the data units in the data block are all transferred from the main memory 12 to the read data register 31 through the memory data path 32.

Each illustrated memory data path 32 and read data register 31 is eight bytes, namely, 64 bits.

Figure 2:
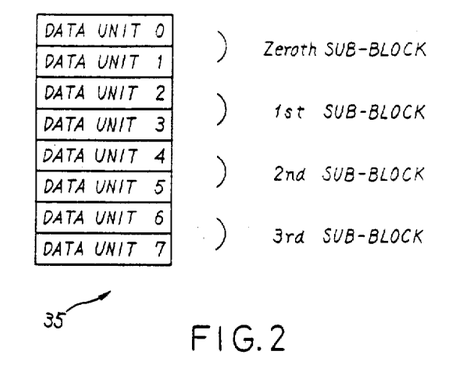
FIG. 2 is a view for use in describing a data block transferred from the main memory.

Referring to FIG. 2, the illustrated data block 35 consists of eight data units each of which is of eight bytes. Thus, the data block is of 64 bytes. The data units are consecutively numbered in the data block 35 from a data unit 0 to a data unit 7. Anyone of the data units 0 to 7 can be indicated by a combination of a block address and a unit address and may be transferred as the leading data unit to the read data register 32. In other words, the leading data unit may be either one of the data units 0 to 7. The block transfer lasts from the leading data unit to a trailing data unit in order of arrival. For example, when the data unit 1 is indicated as the leading data unit, the data unit 0 is received as the trailing data unit.

In the example being illustrated, the data block 35 is divided into zeroth through third sub-blocks each of which consists of a pair of the data units. Consequently, the zeroth sub-block consists of the data units 0 and 1 while the first through third sub-blocks consist of the data units 2 and 3, the sub-blocks 4 and 5, and the sub-blocks 6 and 7, respectively.

For convenience of description, the data units 0, 2, 4, and 6 will be referred to as even numbered data units because each data unit is specified by each unit address of an even number. Likewise, the data units 1, 3, 5, and 7 will be referred to as odd numbered data units.

Figure 3:
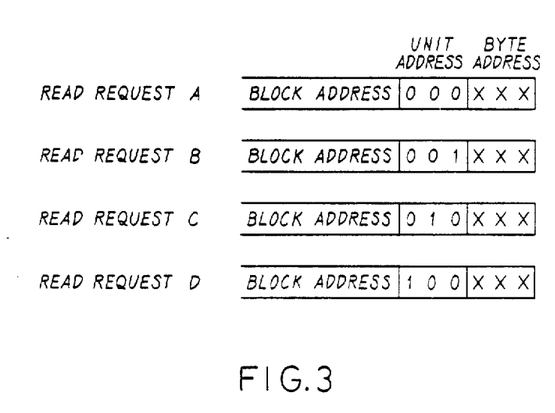
FIG. 3 is a view for use in describing those read addresses of read requests which are given from the request source.

Referring to FIG. 2 together with FIG. 3, let four consecutive ones of the read requests depicted at A, B, C, and D be successively produced by the request source 11 to access a common data block. In this event, the read requests A to D are accompanied by a common block address and six lower bits following the common block address. The six lower bits are divisible into a unit address of three bits and a byte address of three bits. The unit address serves to specify each data unit included in the common data block while the byte address serves to specify the eight bytes included in each unit. The illustrated read requests A, B, C, and D access the data units 0, 1, 2, and 4, respectively.

It is mentioned here that two higher bits of the unit address specify each sub-block described in conjunction with FIG. 2. From this fact, it is readily understood that the read requests A and B access the zeroth sub-block while the read requests C and D access the first and the second sub-blocks, respectively.

Figure 4:
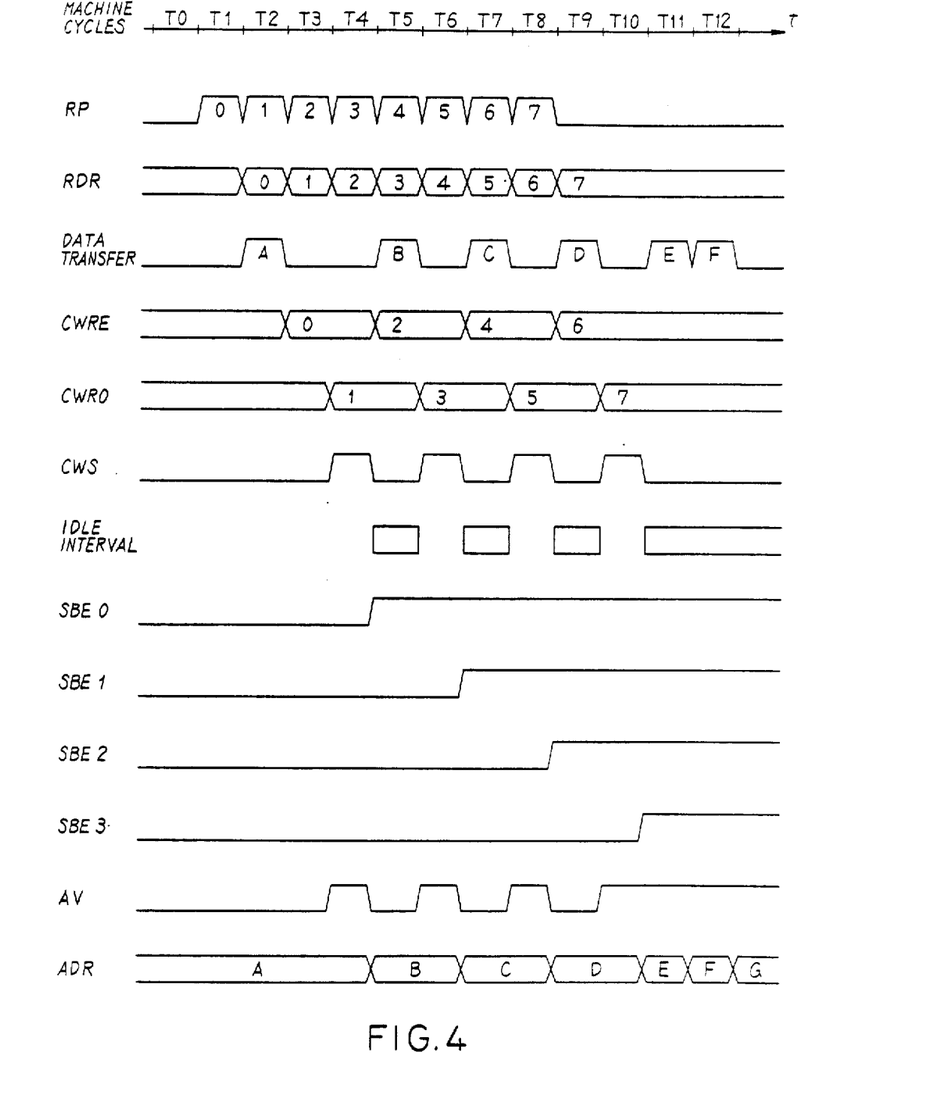
FIG. 4 is a time chart for use in describing operation of the cache memory circuit illustrated in FIG. 1.

Referring to FIG. 4 together with FIGS. 1 and 2, description will be made about operations of the cache memory circuit 10 which are carried out during zeroth through twelfth successive machine cycles T0 to T12. It is assumed that the common data block for the read requests A to D is not stored in the cache memory 15 prior to the zeroth machine cycle T0 and that block transfer is initiated before the zeroth machine cycle T1. As a result, the reply signals RP are successively given during eight machine cycles from the first machine cycle T1 to the eighth one T8. The read data register 31 is loaded with the data units 0 to 7 during the second through ninth machine cycles T2 to T9, respectively, in synchronism with the reply signals RP.

Inasmuch as the read request A is for accessing the data unit 0, as shown in FIG. 3, the data unit 0 is received by the read data register 31 as the leading data unit while the data unit 7 is received as the trailing data unit. The data units received by the read data register 31 may be numbered from the leading data unit to the trailing one in order of arrival and will be named zeroth through seventh ordered data units depicted at 0 to 7 along RDR in FIG. 4.

The zeroth ordered data unit is transferred from the read data register 31 to the request source 11 during the second machine cycle T2, as shown at A in FIG. 4 in response to the read request A directed to the data unit 0.

If the read data register 31 alone is used to write the zeroth through seventh ordered data units into the cache memory 15, such write-in operations should be carried out for eight consecutive machine cycles.

However, the illustrated read data register 31 is coupled to first and second cache write registers 36 and 37 which are for storing the even numbered data units 0, 2, 4, and 6 (FIG. 2), and the odd numbered data units, such as 1, 3, 5, and 7, respectively. In this connection, the first and second cache write registers 36 and 37 may be represented by CWRE and CWRO, respectively.

In the example being illustrated, the even numbered data units are given as the zeroth, second, fourth, and sixth ordered data units while the odd numbered data units are given as the first, third, fifth, and seventh ordered data units. However, the even numbered data units may be received as the first, third, fifth, and seventh ordered data units while the odd numbered data units, the zeroth, second, fourth, and sixth data units. This may be understood from the fact that the order of arrival is determined by the unit address kept in the read address register 22.

Under the circumstances, the first cache write register 36 is loaded with the zeroth ordered data unit during the third machine cycle T3 while the second cache write register 37 is loaded with the first ordered data unit, as shown in CWRE and CWRO in FIG. 4. Similar operation is successively carried out in a manner illustrated in FIG. 4. Consequently, the even and odd numbered data units are successively stored in the first and second cache write registers 36 and 37, respectively, in the example being illustrated.

Anyway, the zeroth through seventh ordered data units are selectively stored in the first and second cache write registers 36 and 37.

As shown in FIG. 4, each of the even number ordered data units is kept in the first cache write register 36 for a first duration equal to two machine cycles. Thus, the first duration is longer than a write-in duration, namely, a single one of the machine cycles necessary for writing each even numbered data unit.

Likewise, each of the odd number ordered data units is stored in the second cache write register 37 for a second duration equal to the first duration. The second duration is divisible into a first partial interval and a second partial interval. The first partial interval may be a front half of each second duration while the second partial interval may be a rear half of each second duration.

Each of the second durations overlaps with two adjacent ones of the first durations that are assigned to two adjacent ones of the even number ordered data units. For example, the first and second partial durations for the first ordered data unit overlap with the first durations for the zeroth and second ordered data units, respectively. Similarly, the second duration for the third ordered data unit overlaps with the first durations for the second and fourth ordered data units.

In FIG. 4, the zeroth and first ordered data units are kept in the first and second cache write registers 36 and 37 and are stored as stored data signals in the cache memory 15 during the fourth machine cycle T4 in response to a cache write signal CWS produced by the controller 16 in a manner to be described later. Anyway, the first and second cache write registers 36 and 37 will be called a write-in circuit for writing the data units in the cache memory 15.

The cache write signal CWS is given to the cache memory 15 for each first partial duration of the second durations which appears for each of the fourth, sixth, eighth, and tenth machine cycles. Supplied with the cache write signal CWS, the cache memory 15 simultaneously stores a pair of the even and odd number ordered data units, such as zeroth and first ordered data units, second and third ordered data units, fourth and fifth ordered data units, and sixth and seventh ordered data units. This means that the first partial interval of the second duration defines the write-in duration.

Idle intervals of time are successively left between two adjacent ones of the cache write signals CWS, as illustrated in FIG. 4. The leftmost one of the idle intervals shown in FIG. 4 appears after the zeroth and first ordered data units are stored in the cache memory 15 in response to the leftmost one of the cache write signals CWS. Thus, the zeroth sub-block (FIG. 2) is loaded with the zeroth and first ordered data units and becomes accessible. In the example being illustrated, the controller 16 supplies the request source 11 with an avail signal AV in synchronism with the cache write signal CWS. The avail signal AV is representative of availability of the zeroth sub-block. Therefore, the following read request B is sent from the request source 11 and received by the address register 21 for the fifth machine cycle T5, namely, the leftmost one of the idle interval.

After production of the avail signal AV, the controller 16 internally produces a zeroth sub-block enable signal SBE0 representative of an enabled state of the zeroth sub-block in a manner to be described. Inasmuch as the read request B is for reading the data unit 1 (FIGS. 2 and 3) which was already stored in the cache memory 15 during the fourth machine cycle T4, the read signal B can be processed by the cache memory circuit 10 during the idle interval.

During the sixth machine cycle T6, the data units 2 and 3 are stored in the cache memory 16 in response to a second one of the cache write signals CWS. Thereafter, the succeeding one of the read requests C is kept in the address register 21 during the seventh machine cycle T7, namely, the idle interval. Inasmuch as the read request C accesses the data unit 2 (FIGS. 2 and 3) which was already stored in the cache memory 15 during the sixth machine cycle T6, the read request C can be processed during the seventh machine cycle T7. Accordingly, the data unit 2 (FIG. 2) is sent through the data selector 28 to the request source 11 during the seventh machine cycle T7. In this event, the first sub-block is enabled by a first sub-block enable signal SBE1 and the above-mentioned operation is carried out with reference to the first sub-block enable signal SBE1.

During the eighth machine cycle T8, a third one of the cache write signal CWS is produced by the controller 16 to store the fourth and fifth ordered data units into the cache memory 15. Concurrently, a third one of the avail signals AV is delivered from the controller 16 to the request source 11. A second sub-block enable signal SBE2 is produced to indicate an enabled state of the second sub-block.

Responsive to the third avail signal AV, the request source 11 produces the read request D which is for accessing the fourth data unit (FIG. 2) during the ninth machine cycle T9, namely, one of the idle intervals.

Thereafter, the sixth and seventh ordered data units are stored in the cache memory 15 during the tenth machine cycle T10. Simultaneously, a fourth one of the avail signals AV is continuously sent from the controller 16 to the request source 11.

Subsequently, the third sub-block is put into an enabled state and a third sub-block enable signal SBE3 is produced to indicate an enabled state of the third sub-block.

Any other read requests, such as E, F, and G can successively be processed in a usual manner when they access a data block stored in the cache memory 15.

Let a conventional cache memory circuit be considered and compared with the cache memory circuit illustrated in FIG. 1. In such a conventional circuit, when block transfer is carried out in connection with a preceding one of read requests, such as A, a following read request B is detained until all of data units in a data block are stored in a cache memory. As a result, the following read request B must be carried out during the eleventh machine cycle.

Figure 5A:
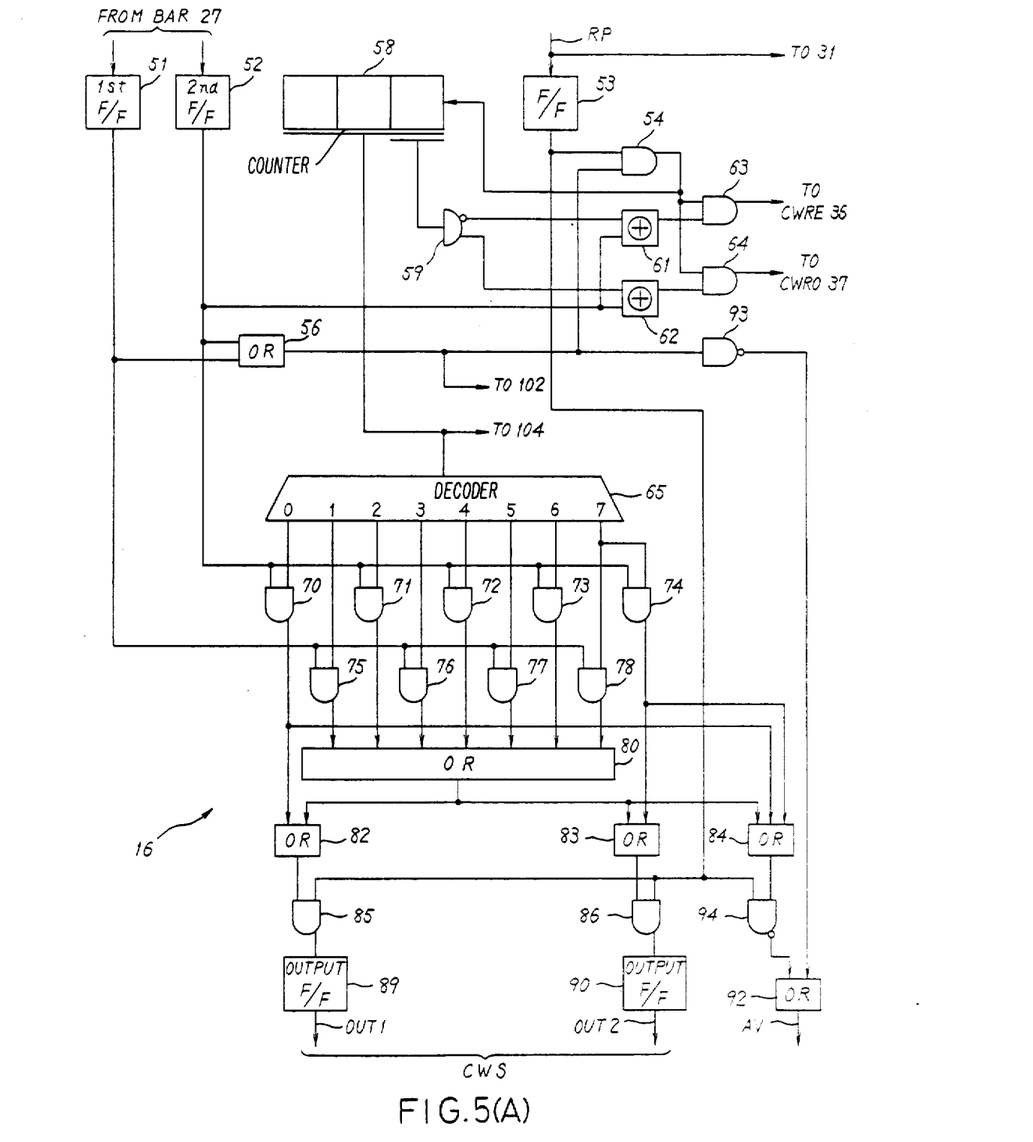
FIGS. 5(A) and (B) are block diagrams of a controller for use in the cache memory circuit illustrated in FIG. 1.
Figure 5B:
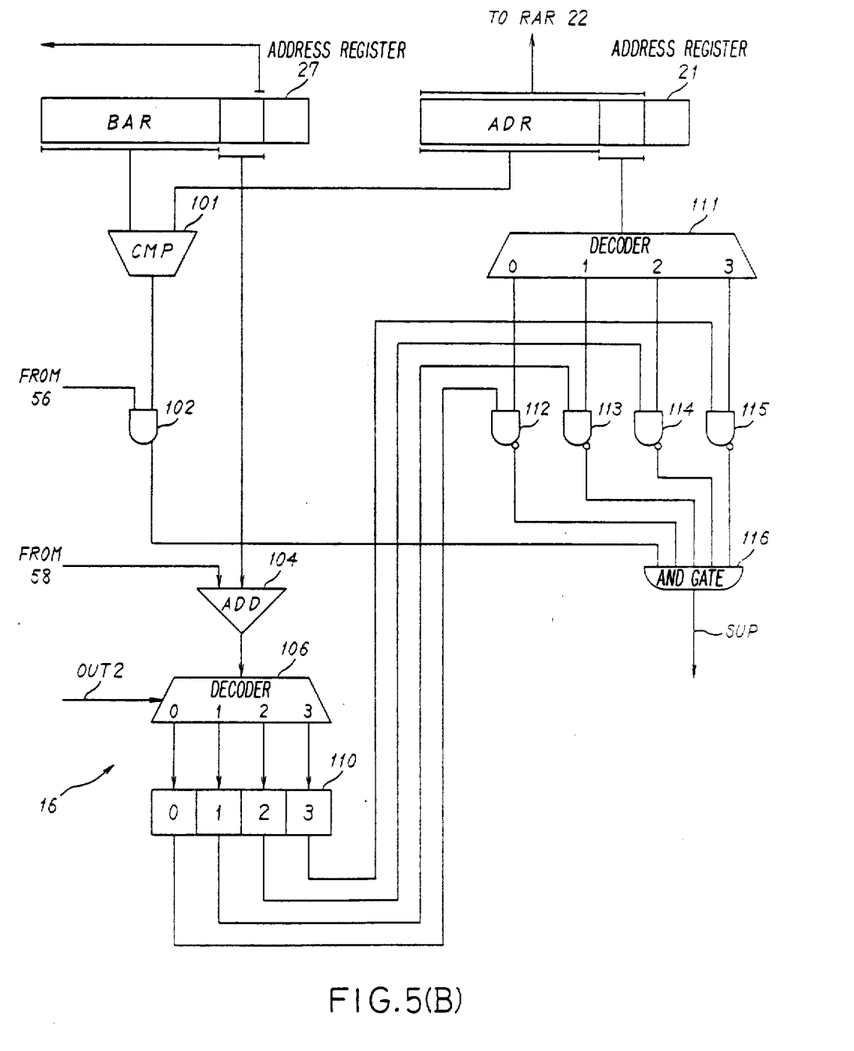
Figure 6A:
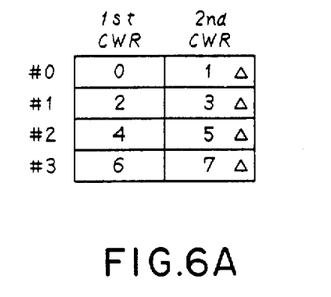
FIGS. 6A and 6B are a view for use in describing operation of the controller illustrated in FIGS. 5(A) and (B)
Figure 6B:
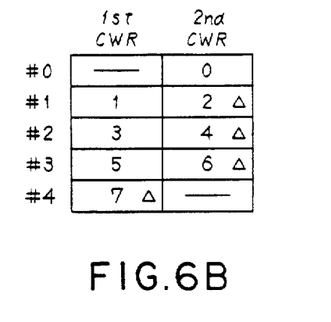

Referring to FIGS. 5(A) and (B) and FIG. 6 together with FIG. 1, the controller 16 is operable in cooperation with the address register 21 and the block load address register 27. The block load address register 27 is loaded with a read address of a read request sent from the address register 21 through the read address register 22 in the manner illustrated in FIG. 1 when a data block for the read request is not stored in the cache memory 15. The read request will be referred to as a specific read request.

As mentioned in FIGS. 1 and 4, the controller 16 serves to deliver the cache write signals CWS to the cache memory 15. Each cache write signal CWS is for simultaneously writing a pair of the even and odd number ordered data units into the cache memory 15.

In FIG. 6(A), the data units 0 to 7 (depicted in blocks) are representative of the order of arrival and may be considered as the zeroth through seventh ordered data units. Le the leading data unit or the zeroth ordered data unit be given as an even numbered data unit which is assigned to an even numbered address, as is the case with the above-mentioned example. In this event, the zeroth through seventh ordered data units are successively and alternatingly transferred from the read data register 31 at first to the first cache write register 36 and succeedingly to the second cache write register 37. It is possible to concurrently move both data units from the first and second cache write registers 36 and 37 to the cache memory 15, if the cache write signal CWS is produced when each of the odd number ordered data units is stored in the second cache write register (CWRO) 37. Accordingly, each of the cache write signal CWS is supplied from the controller 16 to the cache memory 15 each time when the odd number ordered data units, such as 1, 3, 5, and 7, are stored in the second cache write register 37.

In FIG. 6(B), let the leading data unit, namely, zeroth ordered data unit be given an odd numbered data unit. The zeroth ordered data unit depicted at 0 in FIG. 6(B) is stored in the second cache write register 37 while six of the following data units depicted at 1 to 6 are alternatingly assigned to the first and second cache write registers 36 and 37. The trailing, namely, seventh ordered data unit depicted at 7 is stored in the first cache write register 36. From this fact, it is understood that the cache write signals CWS ma be produced when the leading and trailing ordered data units (depicted at 0 and 7) are stored in the second and the first cache write registers 37 and 36, respectively, and when the second, fourth, and sixth ordered data units 2, 4, and 6 are stored in the second cache write register 37.

At any event, the timing of the cache write signals CWS should be changed with reference to the read address for storing the leading data unit in reference to the order of the data units.

Under the circumstances, the least significant bit of a unit address accompanied by the specific read request is monitored to determine whether the unit address is represented by an even number or an odd number. Specifically, the least significant bit of the unit address in question is sent from the block load address register 27 to first and second flip flops (F/F) 51 and 52 which are set when the least significant bit takes a logic "0" level and a logic "1" level, respectively. Thus, the first and the second flip flops 51 and 52 specify even and odd numbers of the unit address, respectively, and may be called even and odd number flip flops, respectively.

On block transfer of the data block in question, the reply signals RP are sent from the main memory 12 to be delivered to the controller 16 and the read data register 31. The read data register 31 stores each of the data units in synchronism with the reply signals RP (FIG. 1).

In the controller 16, each of the reply signals RP is received by a third flip flop 53 to be sent to an AND gate 54 connected to an OR gate 56. Since the OR gate 56 is coupled to the first and second flip flops 51 and 52, the AND gate 54 produces an output signal each time when the reply signals RP are received by the third flip flop 53 with either one of the first and second flip flops 51 and 52 put into a set state.

The output signal of the AND gate 54 is successively counted by a counter 58 of three bits arranged from the most significant bit to the least one. Therefore, the counter 58 can count the output signal from zero to seven of the AND gate 54 to produce a counter output signal. The counter output signal specifies a relative unit address variable during block transfer. The least significant bit of the counter 58 is connected through a gate circuit 59 and a pair of Exclusive OR gates 61 and 62 to AND gates 63 and 64. Both the Exclusive OR gates 61 and 62 are connected to the second flip flop 52 and supplied with two different output signals of the gate circuit 59. The Exclusive OR gate 61 produces the logic "1" level signal when the least significant bit of the counter 58 indicates the even number, namely, the logic "1" level. On the other hand, the Exclusive OR gate 62 produces the logic "1" level signal when the least significant bit of the counter 58 indicates the odd number.

As a result, the AND gate 63 supplies the first cache write register 36 with a cache write indication signal CWRE on reception of the even numbered data units. The cache write indication signal CWRE defines a write-in timing for writing the even numbered data units into the first cache write register 36. On the other hand, the AND gate 64 supplies the second cache write register 37 with an additional cache write indication signal CWRO on reception of the odd numbered data units. The additional cache write indication signal, CWRO defines a write-in timing for writing the odd numbered data units into the second cache write register 37.

The additional cache write indication signal CWRO and the cache write indication signal CWRE alternate with each other.

In FIG. 5(A), the counter 58 is connected to a decoder 65 for decoding a counter output signal of three bits into a decoder output signal of a single bit which appears on one of terminals numbered from zero to seven. Even numbered ones of the terminals are connected to AND gates 70 to 73 coupled to the second flip flop 52. Likewise, the seventh terminal of the decoder 65 is connected to an AND gate 74 operable in cooperation with the second flip flop 52. Odd numbered ones of the terminals including the seventh terminal are connected to AND gates 75 to 78 coupled to the first flip flop 51.

The AND gates 71 to 73 and 75 to 78 are connected through an OR gate 80 to OR gates 82, 83, and 84 while the AND gate 70 and the AND gate 74 are connected direct to the OR gates 8 and 84 and to the OR gates 83 and 84, respectively.

The OR gates 82 and 83 are connected through AND gates 85 and 86 to first and second output flip flops 89 and 90, respectively.

It is to be recollected here that each pair of the data units stored in the first and second cache write registers 36 and 37 must be moved to the cache memory 15 at the time instants described in conjunction with FIG. 6. In short, a combination of the decoder 65 and the above-mentioned logic circuit serves to deliver the cache write signal CSW to the cache memory 15 at that time instant.

More particularly, when the leading unit address for the leading data unit is assigned with an even number, the AND gates 75 to 78 are successively enabled by the decoder output signal to produce the logic "1" level signal. The logic "1" level signal is delivered to the first and second output flip flops 89 and 90 through the OR gates 80, 82, and 83 and the AND gates 85 and 86 enabled in synchronism with each reply signal RP. The first and second output flip flops 89 and 90 simultaneously produce first and second flip flop output signals OUT1 and OUT2 as the cache write signal CWS. The first flip flop output signal OUT1 serves as a write-in indication for the even numbered unit addresses while the second flip flop output signal OUT2 serves as a write-in indication for the odd numbered unit addresses.

When the leading unit address for the leading data unit is assigned with an odd number, the AND gates 70 to 74 are enabled by the decoder output signal to produce the logic "1" level signal. The logic "1" level is delivered to the first and second output flip flops 89 and 90 at each time instant described in conjunction with FIG. 6(B). The first and second output flip flops 89 and 90 produce the first and second flip flop output signals OUT1 and OUT2 as the cache write signal CWS in the above-mentioned manner.

The first and second flip flop output signals OUT1 and OUT2 last during a single machine cycle as illustrated in FIG. 4. Therefore, a combination of the first and second flip flops 51 and 52, the counter 58, the decoders 65, the first and second output flip flops 89 and 90, and the logic circuit between the decoder 65 and the first and second output flip flops 89 and 90 is operable to define the write-in durations and the idle intervals.

The first and second output flip flops 89 and 90 serve to adjust the timings for the cache write signal CWS by delaying signals sent from the AND gates 85 and 86.

The first and second flip flops 51 and 52 are coupled through the OR gate 56 and an inverter 93 to an output OR gate 92 for producing the avail signal AV illustrated in FIG. 4. The avail signal AV appears when both the first and second flip flops 51 and 52 are not set. The output OR gate 92 is also coupled to a NAND gate 94 connected to the OR gate 84 and the third flip flop 53.

A circuit shown in FIG. 5(A) may be called a first circuit section for producing the cache write signal CSW and the avail signal AV.

In FIG. 5(B), the controller 16 comprises a second circuit section coupled to the block load address register 27 and the address register 21 and to the OR gate 56, the counter 58, and the second output flip flop 90 illustrated in FIG. 5(A). The second circuit section comprises a comparator 101 for comparing the block address of the specific read request stored in the block load address register 27 with a next block address of the following read request stored in the address register 21. The next block address is given in response to the avail signal AV. The comparator 101 supplies the logic "1" level signal to an AND gate 102 connected to the OR gate 56 (FIG. 5(A)) when the block address is coincident with the next block address. Consequently, the AND gate 102 is enabled when either one of the first and second flip flops 51 and 52 is set and the coincidence is detected between the block address and the next block address. This means that the following read request accesses a data block which is in the course of the block transfer carried out in response to the specific read request The leading unit address of the specific read request is delivered from the block load address register 27 to an adder 104 of three bits connected to the counter 58 (FIG. 5(A)). The adder 104 adds the leading unit address to the relative unit address and produces a sum of the leading unit address and the relative unit address. Inasmuch as the relative unit address is initially equal to zero, the leading unit address is at first sent from the adder 104 to a decoder 106 and the data unit for the specific read request is read out of the main memory 12 as the zeroth ordered data unit in synchronism with a zeroth one of the reply signals RP. Thereafter, a sum of the leading unit address at the relative unit address is cyclically varied one by one in response to each of the reply signals RP and is produced as a sum signal.

The decoder 106 is supplied from the second output flip flop 90 with the second flip flop output signal OUT2 as an enable signal. Therefore, the decoder 106 is enabled each time when the cache write signal CWS is delivered to each of the odd numbered unit addresses.

As already described before, two upper bits of each unit address specify the sub-blocks illustrated with reference to FIG. 2. The decoder 106 decodes two upper bits of the sum signal into a decoded signal of a single bit which is sent through one of four decoder output terminals. The decoded signal is representative of the fact that the corresponding sub-block is loaded with the data unit or units.

A sub-block monitoring circuit 110 comprises four flip flops which are assigned to the zeroth through third sub-blocks and which are loaded with the decoded signal to produce the zeroth through third sub-block enable signals SBE0 to SBE3 when each sub-block is loaded with the data unit or units. Thus, the sub-block enable signals SBE are indicative of availabilty of the sub-blocks specified by the sum signal.

On the other hand, a next unit address stored in the address register is delivered to an additional decoder 111. The additional decoder 111 decodes two higher bits of the next unit address into a next sub-block signal indicative of a next sub-block accessed by the following read request. The next sub-block signal is compared with the sub-block enable signal SBE by the use of four NAND gates 112 to 115 and an AND gate 116. When the next sub-block is not enabled by the sub-block enable signal, a suppress signal SUP is delivered from the AND gate 116 to the cache memory 15 (FIG. 1). As a result, the cache memory 15 is not accessed by the next read request stored in the address register 21.

The controller thus comprises the sub-block monitoring circuit 110 for indicating accessibility of each sub-block and the remaining part for processing a next read request which follows the specific read request.

Figure 7:
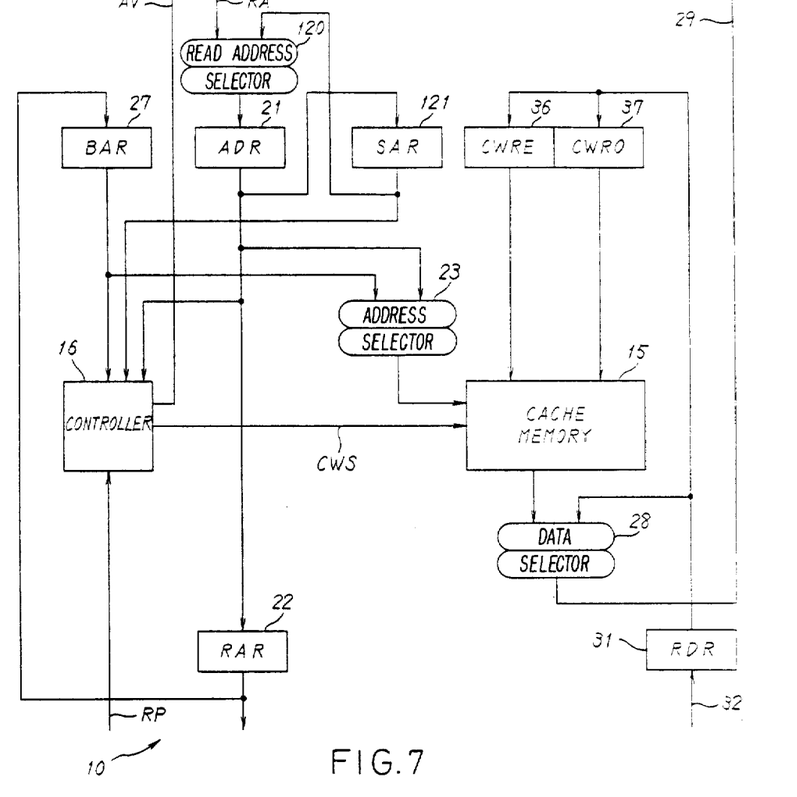
FIG. 7 is a block diagram of a cache memory circuit according to a second embodiment of this invention.

Referring to FIG. 7, a cache memory circuit 10 according to a second embodiment of this invention is similar to that illustrated in FIG. 1 except that the cache memory circuit 10 (FIG. 7) comprises a read address selector 120 and a saving or preservation address register (SAR) 121 coupled to the address register 21, the controller 16, and the read address selector 120. The controller 16 comprises the sub-block monitoring circuit 110 as shown in FIG. 5(B) and is therefore operable in a manner similar to that illustrated in FIG. 1.

The illustrated cache memory circuit 10 can successively receive read requests which are sent from the request source (not shown in FIG. 7) and which are accompanied by read addresses RA. Each of the read addresses is divisible into a block address, a unit address, and a byte address, as mentioned in conjunction with FIG. 3. It is to be noted that reception of each read address is possible even when data transfer is being carried out in relation to a preceding one of the read requests in a manner to be described later.

Figure 8:
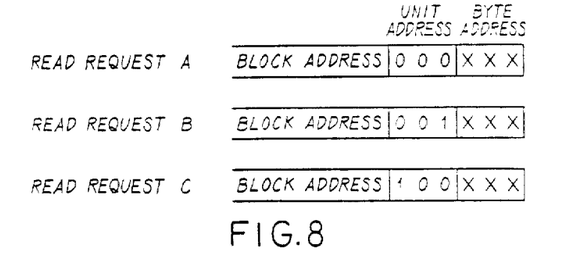
FIG. 8 is a view for use in describing those read addresses of read requests which are given to the cache memory circuit illustrated in FIG. 7.

Referring to FIG. 8 together with FIG. 7, it is assumed that three consecutive ones of the read requests A, B, and C are accompanied by first, second, and third read addresses, respectively. The first through third read addresses comprise the same block addresses and different unit addresses. The byte addresses may be left out of consideration. As readily understood from FIG. 3, the unit addresses of the read requests A and B shown in FIG. 8 specify the zeroth sub-block while the unit address of the read request C specifies the third sub-block.

Let the cache memory 15 illustrated in FIG. 7 fail to store a data block required by the read requests A, B, and C. In this event, the first read address of the read request A is stored in the address register 21 through the read address selector 120 and is thereafter delivered to the main memory 12 (FIG. 1) through the read address register (RAR) 22 in the manner described in conjunction with FIG. 1 so as to initialize block transfer.

When the first read address is moved to the read address register 22, the second read address of the read request B is received through the read address selector 120 to the address register 21. The controller 16 monitors the address register 21 and detects that the second read address specifies the data block requested by the read request A. In this event, the controller 16 makes the avail signal AV invalid. The second read address is moved from the address register 21 to the saving address register 121 while the third read address of the read request C is stored in the address register 21 through the read address selector 120. Under the circumstances, the block transfer is started in the illustrated cache memory circuit 10.

Figure 9:
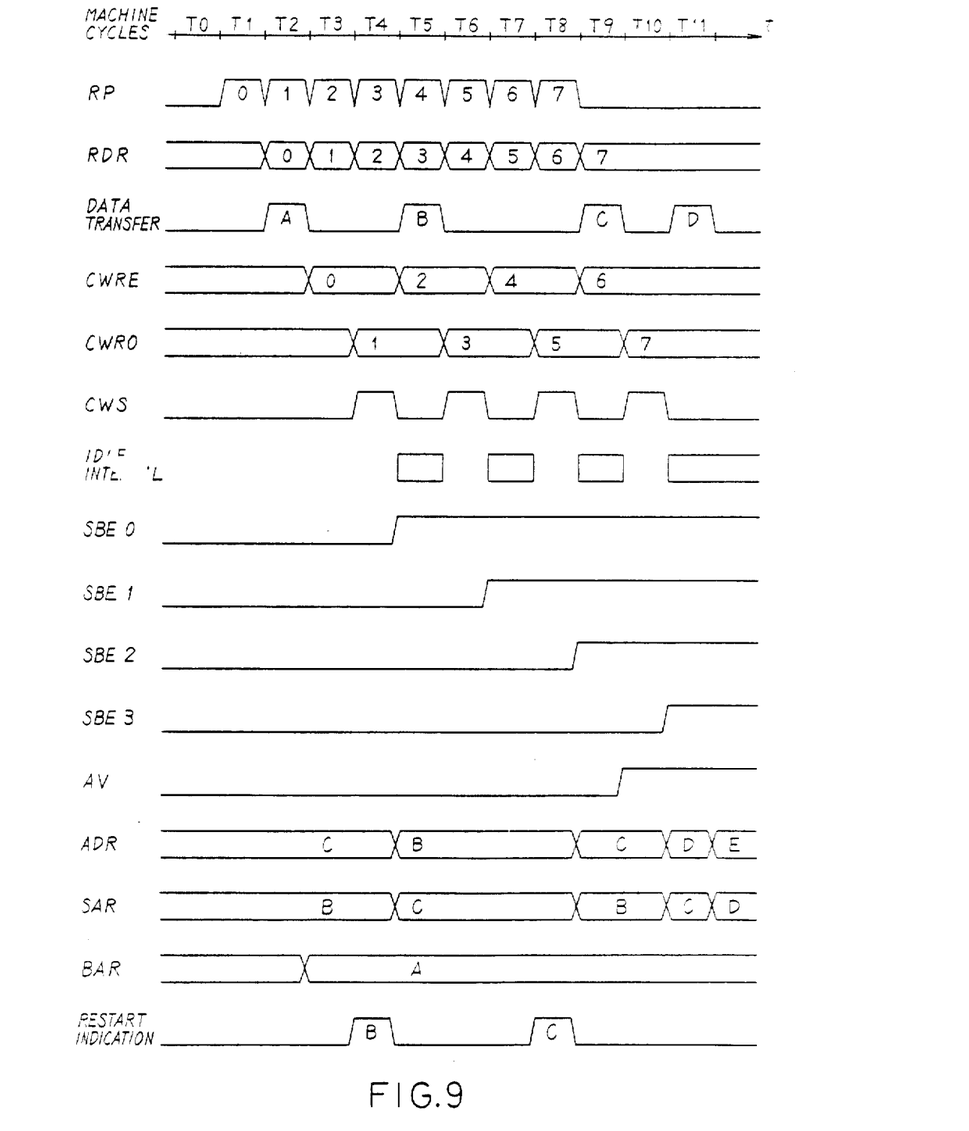
FIG. 9 is a time chart for use in describing operation of the cache memory circuit illustrated in FIG. 7.

Referring to FIG. 9 in addition to FIGS. 7 and 8, the address register (ADR) and the saving address register (SAR) 121 are initially loaded with the third read address (C) and the second read address (B), respectively, as described above. The reply signals RP are successively sent from the main memory 12 to the controller 16 for eight machine cycles from the first machine cycle T1 to the eighth one T8. The reply signals RP are produced in response to the read request A.

Likewise, the read data register (RDR) 31 is successively loaded with data units of the data block in question in synchronism with the reply signals RP. The data units are successively received from the second machine cycle and numbered from a zeroth unit to a seventh unit in order of arrival. The zeroth unit for the read request A is stored in the read data register 31 during the second machine cycle T2 and is transferred to the request source 11 through the data selector 28. After transfer of the zeroth unit to the request source, each data unit is successively delivered to the first and second cache write registers 36 and 37 in the above-mentioned manner and is stored in the cache memory 15 in response to the cache write signal CWS described in conjunction with FIG. 5(A). As a result, the idle intervals are left between two adjacent ones of the cache write signals CWS.

On the other hand, the read request B is for accessing the zeroth sub-block and can be processed during the idle interval when the zeroth sub-block becomes available after the fourth machine cycle T4. As shown in FIG. 7, the zeroth and the first data units are stored in the cache memory 15. In order to process the read request B, the second read address (B) must be returned back to the address register 21 with the third read address (C) moved to the saving address register 121. For this purpose, a restart indication is delivered to the address register 21, the saving address register 121, and the read address selector 120 during the fourth machine cycle T4, as shown along the bottom line of FIG. 9. As a result, the read request B is processed during the fifth machine cycle T5 with the second and third read addresses (B) and (C) kept in the address register 21 and the saving address register 121, respectively. The data unit in question is sent from the cache memory 15 to the request source 11.

The third read address of the read request C is moved to the saving address register 121 during the fifth machine cycle T5 and is not processed until the second sub-block becomes available. In FIG. 9, the restart indication is produced during the eighth machine cycle T8 and the read request C is executed during the ninth machine cycle T9. Thus, execution of the read request C is postponed until the ninth machine cycle T9. Anyway, a data signal indicated by the read request C is delivered from the cache memory 15 to the request source through the data selector 28.

After the ninth machine cycle T9, any read request does not remain unprocessed in the address register 21 and the saving address register 121. The controller 16 delivers the avail signal AV to the request source 11 during the tenth machine cycle T10. Accordingly, the following read requests, such as D, E, can be received by the cache memory circuit 10 after the tenth machine cycle T10.

In the cache memory circuit 10 shown in FIG. 7, the avail signal AV does not become invalid until a leading one of data units is transferred from the main memory 12, even when block transfer is initialized in connection with a preceding one of the read requests A following one of the read requests is therefore received by the cache memory circuit 10 after initialization of the block transfer and can be processed before reception of the leading data unit. If a data signal requested b the following read request is present in the cache memory 15, the data signal is sent to the request source 11. Otherwise, next block transfer is initialized by the cache memory circuit 10.

As mentioned with reference to FIG. 7, the avail signal AV becomes invalid when coincidence is detected between the block addresses of preceding and following read requests. Only a single read address is received on invalidation of the avail signal AV and no read request is received after the avail signal AV becomes invalid. In this case, a read address of the following read request is preserved in the saving address register 121 to wait for block transfer. When the sub-block enable flip flops are set as a result of the block transfer, comparison is made between block addresses stored in the block load address register 27 and in the saving address register 121. In addition, states of the sub-block enable flip flops are monitored in the manner described in conjunction with FIG. 5(B). Therefore, it is possible to judge when each read request preserved in the saving address register 121 is to be processed in the cache memory circuit 10. In other words, the saving address register 121 serves to search for a restart timing of the read request While this invention has thus far been described in conjunction with a few embodiments thereof, it will readily be possible for those skilled in the art to put this invention into practice in various other manners. For example, the number of the cache write registers may be greater than two so as to define the write-in duration and the idle interval. The number of the data units included in each data block may not be restricted to eight.

What is claimed is:

1. A cache memory circuit operated in cooperation with a main memory to fetch a data block from said main memory in response to a read request followed by a next read request, said data block being divisible into a sequence of sub-blocks each of which is composed of a plurality of data units successively transferred from said main memory, each of said data units being transferred from said main memory to said cache memory at each transfer timing, said cache memory circuit comprising a cache memory for memorizing said data block, comprising:

buffering means coupled to said cache memory for successively buffering said data units transferred from said main memory, to form said sub-block of a plurality of the data units that is to be written into said cache memory for each write-in duration followed by an idle time during which said cache memory is accessible by said next read request;

monitoring means coupled to said buffering means for monitoring each sub-block of the block which is being block transferred into said cache memory;

said monitoring means including first indicating means for indicating each sub-block of the block that is written into said cache memory and placed in an available status and second indicating means for indicating data availability of said each sub-block that is placed in said available status in the cache memory for the next read request during said idle time; and processing means coupled to said monitoring means and said cache memory for processing the next read request in response to said data availability to read, out of said cache memory, the data unit in said block which is being block transferred.

2. A cache memory circuit operated in cooperation with a main memory to fetch a data block from said main memory in response to a read request followed by a next read request, said data block being divisible into a sequence of sub-blocks each of which is composed of a plurality of data units successively transferred from said main memory, said cache memory circuit comprising:

a cache memory for memorizing said data block;

buffering means coupled to said cache memory for successively buffering said data units transferred from said main memory, to form said sub-block of a plurality of the data units that is to be written into said cache memory for each write-in duration followed by an idle time during which said cache memory is accessible by said next read request;

monitoring means coupled to said buffering means for monitoring each sub-block of the block which is being block transferred into said cache memory;

said monitoring means including first indicating means for indicating each sub-block of the block that is written into said cache memory and placed in an available status and second indicating means for indicating data availability of said each sub-block that is placed in said available status in the cache memory for the next read request during said idle time; and processing means coupled to said monitoring means and said cache memory for processing the next read request in response to said data availability to read, out of said cache memory, the data unit in said block which is being block transferred.

* * * * *